L. E. BIEGER.
END GATE.
APPLICATION FILED SEPT. 22, 1920.
1,384,228.
Patented July 12, 1921.
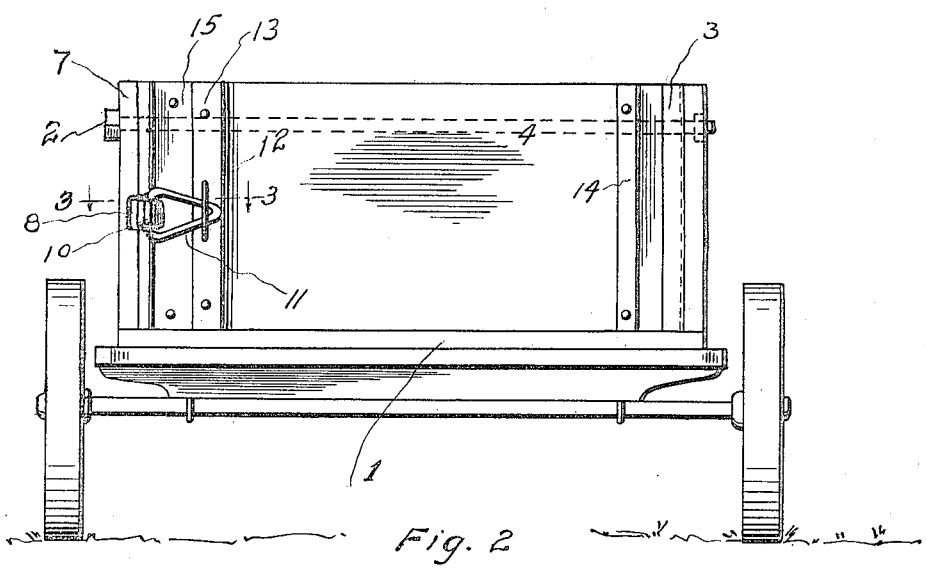
Fig. 1
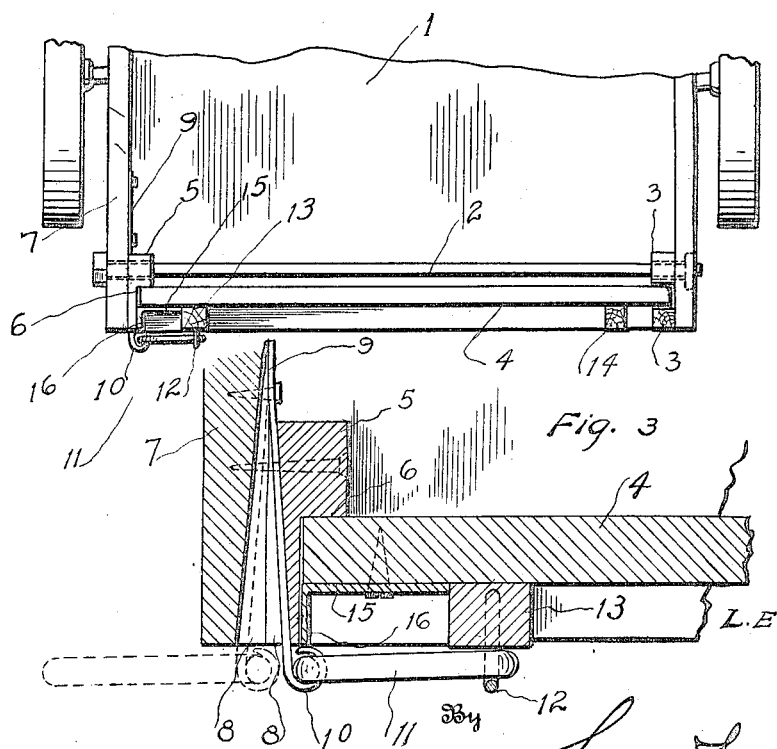
Fig. 2
Fig. 3
Inventor
L. E. Bieger
By Lacy & Lacy, Attorneys

UNITED STATES PATENT OFFICE.

LOUIS E. BIEGER, OF ABSAROKEE, MONTANA.

END-GATE.

1,384,228. Specification of Letters Patent. Patented July 12, 1921.

Application filed September 22, 1920. Serial No. 411,888.

*To all whom it may concern:*

Be it known that I, LOUIS E. BIEGER, a citizen of the United States, residing at Absarokee, in the county of Stillwater and State of Montana, have invented certain new and useful Improvements in End-Gates, of which the following is a specification.

This invention relates to end gates and has for its object the provision of simple and inexpensive means whereby the end gate will be securely held in closed position when in use and may be quickly and easily removed to permit discharge of the contents of a wagon body or placed in operative position to retain a load within the body. The invention is illustrated in the accompanying drawings, and will be hereinafter fully described, the novel features being subsequently more particularly pointed out.

In the drawings—

Figure 1 is an end elevation of a wagon body having my improved end gate applied thereto;

Fig. 2 is a plan view of the rear end of the wagon body with the end gate in closed position;

Fig. 3 is an enlarged horizontal section on the line 3—3 of Fig. 1.

The wagon bed or box 1 is of the usual dimensions and the sides thereof are held against spreading at their rear ends by a bolt 2 inserted through the same, as shown in Fig. 2 and as will be readily understood. To one side of the wagon box on the inner face thereof, I secure the spaced standards 3 between which one end of the end gate 4 may be received. To the opposite side of the wagon box I secure a standard 5 which is rabbeted in its rear edge, as shown at 6, whereby a shoulder is produced against which the opposite end of the end gate may be placed and the said standard 5 is of such width that it will extend to the extreme end of the side of the wagon box. In the opposed faces of the standard 5 and the adjacent side 7 of the wagon box, I form recesses or grooves 8 which are open at their rear ends and diminish in depth toward their front ends. To the side 7 in advance of the recesses or grooves 8, I secure the front end of a leaf spring 9 and this leaf spring extends through the said grooves and rearwardly beyond the same, being provided at its rear extremity with an eye 10. In the said eye 10 is mounted for swinging movement a latch 11 which, as illustrated, may conveniently be a loop of triangular form having its apex free and adapted to engage in a keeper 12 secured upon the end gate. The said keeper is U-shaped and is shown as provided upon a brace or standard 13 which is secured upon the outer side of the end gate and a similar brace 14 is secured upon the end gate near the opposite end thereof, as clearly shown in Figs. 1 and 2. A reinforcing plate 15 is also secured to the outer side of the end gate and extends between the standard 13 and the adjacent end of the gate where it is provided with a rearwardly turned flange 16 adapted to bear against the inner side of the standard 5. The free edge of the flange 16 may bear against the eye 10 of the spring 9 so as to aid in holding the end gate in closed upright position as will be readily understood.

In applying my improved end gate to the wagon box the end thereof remote from the bracing angle plate 15 is engaged between the standards 3 and the gate then rocked in a horizontal plane so that the opposite end thereof will be brought into the rabbet of the standard 5, as shown clearly in Figs. 2 and 3, with the flange 16 filling the space between the outer side of the end gate and the eye 10, it being understood, of course, that the latch is held out of the way of the gate while the same is being placed in position, as indicated by the dotted lines in Fig. 3. After the end gate is in place the latch 10 is swung about its engagement with the eye 10 so as to assume a position in rear of the end gate, after which its apex is brought into engagement with the keeper 12 and the spring 9 released. The latch will then be forced into positive engagement with the U-shaped keeper and extend through the same to bear against the brace 13 so as to effectually hold the end gate in its operative position. When it is desired to unload the wagon, the latch is withdrawn from the keeper 12 by slight lateral pressure exerted upon the eye 10, after which the gate may be readily removed as will be evident from an inspection of the drawings. The keeper provides a convenient handle for withdrawing the end gate from the wagon body, and the latch also provides a convenient handle for shifting the spring out of engagement with the rear side of the end gate, and it will be noted, upon particular reference to Fig. 3, that the eye at the end of the spring serves to effectually retain the end gate in closed position even if the latch be free of the keeper.

My device is obviously simple in construction and may be applied to any wagon box at a slight expense. When in use it will effectively hold the end gate in operative position so that the premature or accidental discharge of the load will be avoided, although when the load is to be discharged the end gate may be quickly and easily removed.

Having thus described the invention, what is claimed as new is:

1. The combination with a wagon box provided at its rear end on one side with spaced standards and at its opposite side with a single standard having its inner side rabbeted toward its rear edge, an end gate having one end adapted to be engaged between the spaced standards and its opposite end adapted to seat within the rabbet of the other standard, and a latch yieldably mounted upon the wagon bed between the same and the rabbeted standard and adapted to engage the rear side of the end gate at that end thereof fitting within the rabbeted standard.

2. The combination with a wagon box having spaced standards at its rear end at one side and provided at its opposite side with a single standard extending to the rear end of the box, said last-mentioned standard being rabbeted and having the rabbet extending to the rear edge thereof, the said standard and the adjacent side of the box being provided with registering grooves in their opposed sides, a spring secured to said side in advance of the standard and playing in the said grooves, a latch mounted upon the free end of said spring for swinging movement, an end gate adapted at one end to engage between the spaced standards and having its opposite end adapted to fit within the rabbet of the rabbeted standard, an angle brace secured to the outer side of the end gate and filling the space between the same and the end of the said rabbet, and a keeper secured upon the end gate and adapted to be engaged by the free end of the latch.

3. The combination with a wagon box, and an end gate fitted thereto, of a leaf spring secured to the wagon box and projecting beyond the rear end thereof, a keeper on the end gate, and a latch mounted on the projecting end of the leaf spring for swinging movement and adapted to engage the keeper.

In testimony whereof I affix my signature.

LOUIS E. BIEGER. [L. S.]